July 15, 1924.
C. O. HALLING
1,501,597
RIM BREAKING, CONTRACTING, AND EXPANDING DEVICE
Filed June 28, 1922
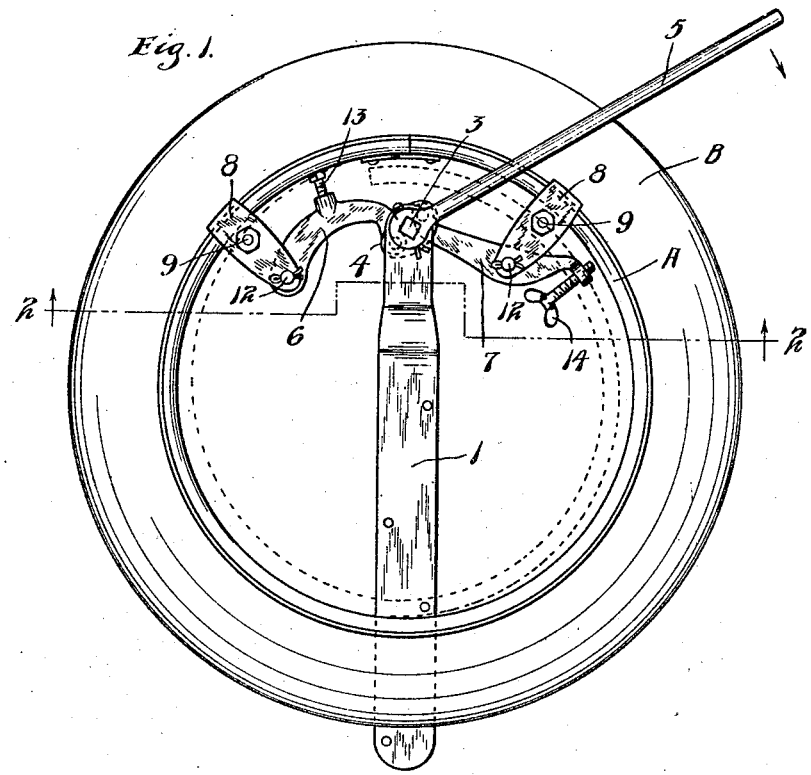
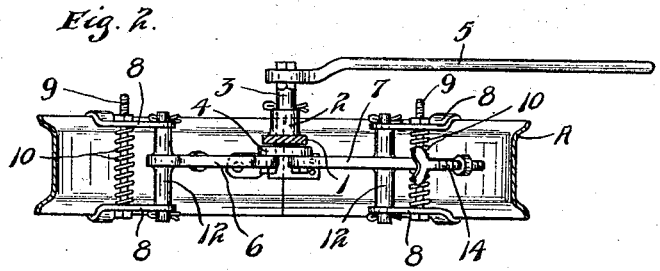
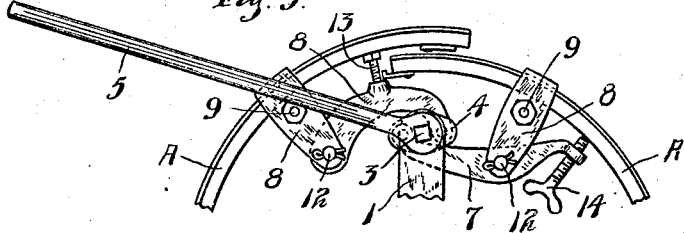
INVENTOR.
CHARLES O. HALLING.
BY HIS ATTORNEY.
James F. Williamson Patented July 15, 1924.

1,501,597

UNITED STATES PATENT OFFICE.

CHARLES O. HALLING, OF MILAN, MINNESOTA.

RIM BREAKING, CONTRACTING, AND EXPANDING DEVICE.

Application filed June 28, 1922. Serial No. 571,420.

*To all whom it may concern:*

Be it known that I, CHARLES O. HALLING, a citizen of the United States, residing at Milan, in the county of Chippewa and State of Minnesota, have invented certain new and useful Improvements in Rim Breaking, Contracting, and Expanding Devices; and I do hereby declare the following to be a full, clear, and exact description of the invention, such as will enable others skilled in the art to which it appertains to make and use the same.

This invention relates to a device for breaking, contracting and expanding a tire rim for the purpose of removing and replacing the tire. The device is of the type adapted to be mounted on a fixed support and disposed adjacent means for supporting the tire and rim. Split demountable rims are now widely used on automobiles and great difficulty has been experienced in securing a simple and efficient device for quickly breaking and contracting said rims to remove the tire therefrom.

It is an object of this invention, therefore, to provide a device of simple and inexpensive construction, by means of which the rim can be quickly broken and contracted and the tire removed therefrom, which device also acts efficiently to expand the rim and bring the same to closed position.

It is a further object of the invention to provide such a means having rim clamping jaws and swinging means connected thereto adapted to be eccentrically connected to means rotating about a fixed axis, said swinging means being provided, respectively, with means causing one end of the rim to move inwardly during the initial movement of the device, and means for preventing the other end of the rim from moving inwardly.

It is more specifically an object of the invention to provide rim clamping jaws adapted to clamp the rim at points spaced at each side of the joint, which jaws are pivotally connected to oppositely disposed links, which links are connected at one end to opposite sides of a member adapted to be turned about a fixed axis, said links each being provided with adjustable means for contacting said rim.

These and other objects and advantages of the invention will be fully set forth in the following description made in connection with the accompanying drawings in which like reference characters refer to the same parts throughout the different views, and in which—

Fig. 1 is a plan view of the device showing the same applied to a rim in its closed position, the contracted position of the rim being indicated in dotted lines;

Fig. 2 is a vertical section taken on the line 2—2 of Fig. 1, as indicated by the arrows; and Fig. 3 is a partial plan view of the device and rim showing the same with the rim in contracted position.

Referring to the drawings, a split rim for an automobile wheel and tire is shown as A having thereon a tire B. In accordance with the present invention, the fixed support 1 is provided adapted to be rigidly secured to a bench or other means and formed in the shape of a flat bar or strap. The member 1 is illustrated as somewhat tapered adjacent its front end which is of less width than the main body portion and preferably disposed in a lower plane than said main body portion. Said end portion of the member 1 is provided with a boss 2 forming the bearing for a stud 3 held in place by suitable means such as a cotter pin shown and carrying at its lower end a small oblong plate 4. The member 3 is of angular formation at its upper end and adapted to receive an apertured end of a handle bar 5 by which it and the plate 4 are turned. The plate 4 has pivotally connected to its opposite ends the bent ends of opposite disposed links 6 and 7 formed in the shape of flat bars and the link 6 has pivotally connected to its outer end a rim clamping member. The other link 7 has pivotally connected at an intermediate point thereof a similar rim clamping member. Said rim clamping members each comprise a pair of oppositely disposed jaws 8 formed of flat bars having curved portions at their outer ends adapted to fit over the edge of the rim. Each pair of jaws is apertured to receive a headed and nutted bolt 9 by means of which they are clamped in position on the rim and said bolts are each surrounded by a coiled spring 10 adapted to separate the jaws 8 when the nuts on the bolts are loosened to relieve the clamping pressure. The jaws 8 are apertured at their inner ends to fit over reduced ends of pintle members 12 extending at each side of and formed as an integral part of the links 6 and 7. The jaws 8 are held on said reduced portions by any suitable means, such as the split keys shown. The link 6 is provided along its outer edge with a threaded boss adapted to receive an adjustable threaded bolt 13 and the link 7 is provided with a threaded boss at its outer end adapted to receive a thumb screw 14.

In operation, when it is desired to break and contract the rim the same is brought into position relatively to the device, as shown in Fig. 1 and the jaws 8 are clamped on the rim at opposite sides of the joint thereof. The screw 13 is adjusted so as to contact with the rim and the screw 14 adjusted so as to be slightly out of contact therewith. The handle 5 is then swung in the direction indicated by the arrow in Fig. 1. This moves the links 6 and 7 in opposite directions and the bolt 13 pushes on the rim tending to push the left hand end thereof, as shown in Fig. 1, outwardly, while the link 7, through its clamping screw pulls inwardly on the rim so that the two ends of the rim are moved out of alinement by the initial movement of handle 5 and the rim thus broken. After the ends of the rim have cleared or at approximately such point, the screw 14 will come in contact with the rim. This will prevent too great stress being placed on the extreme end of the rim which might distort or bend the same and the point of engagement with the rim is moved further from the jaws insuring that the rim will be sprung through a large radius. The continued movement of the handle 5 swings the end of the rim into the positions shown in Fig. 3, the handle 5 being moved far enough to swing the pivotal points of the links 6 and 7 on plate 4 across the dead center. The handle 5 tends to snap into its position and the device will remain in this position without further attention. The tire can now be easily removed from the rim and replaced thereon when desired. The rim will be expanded and brought to its original position by a reverse movement of the handle bar 5, the ends of the rim being brought into exact alinement and correct relationship. The screws 13 and 14 will have to be adjusted to rims of different diameters and the device is thus adjustable to efficiently handle rims of various sizes.

From the above description it is seen that applicant has provided an extremely simple and efficient rim breaking, contracting and expanding device adapted for garage use. The parts of the device are all extremely simple and the device can be easily and inexpensively manufactured. When once assembled, the parts have no tendency to become disarranged and the device is extremely durable.

It will, of course, be understood that various changes may be made in the form, details and arrangement of the parts without departing from the scope of applicant's invention, which, generally stated, consists in the matter shown and described and set forth in the appended claims.

What is claimed is:

1. A rim breaking, contracting and expanding device having in combination, a pair of rim clamping devices adapted to clamp the rim at each side of the joint thereof, a pair of swinging means pivotally connected thereto, a member swingable about an axis extending substantially at right angles to the plane of the rim, said axis being disposed between said clamping members to which said swinging means are also pivotally connected, means on one of said swinging members contacting the rim between the clamping member and the end thereof, and means on the other swinging member adapted to contact the rim on the side of the clamping member away from the joint.

2. A rim breaking, contracting and expanding device comprising, a support, a member rotatable about a fixed axis thereon, oppositely disposed links pivotally connected at one end to opposite sides of said member, means for rotating said member, a rim clamping device pivotally connected to the end of one of said links, a rim clamping device pivotally connected intermediate the ends of the other link, an adjustable rim contacting member intermediate the ends of the first mentioned link, and an adjustable rim contacting member at the end of the other link.

3. A rim breaking, contracting and expanding device having in combination, a fixed support, a plate rotatably mounted thereon, links pivotally connected to opposite sides of said plate, a handle for turning said plate, a rim clamping device pivotally connected to each link and adjustable means on one of said links contacting the rim between the rim clamping member and the end of the rim, and adjustable means on the other link adapted to contact the rim at a point on the opposite side of the rim clamping member from the end of the rim.

4. A rim breaking, contracting and expanding device having in combination, a fixed support, a rotatable member mounted thereon, oppositely disposed links having curved ends pivotally connected to opposite sides of said member, a rim clamping device pivotally connected to the end of one of said links, an adjustable member intermediate the ends of said link adapted to contact the rim, a rim clamping member pivotally connected to an intermediate point on the other link, an adjustable member at the end of said latter link adapted to contact the rim, and a handle bar for turning said rotatable member.

In testimony whereof I affix my signature.

CHARLES O. HALLING.